United States Patent [19]

Wiegand

[11] 4,111,187
[45] Sep. 5, 1978

[54] MODULAR SOLAR RADIATION COLLECTOR

[75] Inventor: James B. Wiegand, Longmont, Colo.

[73] Assignee: Solar Energy Research Corp., Longmont, Colo.

[21] Appl. No.: 759,762

[22] Filed: Jan. 17, 1977

[51] Int. Cl.² ............................................. F24J 3/02
[52] U.S. Cl. .................................................. 126/271
[58] Field of Search ............... 126/271, 270; 237/1 A; 34/93

[56] References Cited

U.S. PATENT DOCUMENTS

| | | | |
|---|---|---|---|
| 3,146,774 | 9/1964 | Yellott | 126/271 |
| 3,411,163 | 11/1968 | Meyers, Jr. | 126/271 |
| 3,620,206 | 11/1971 | Harris, Jr. | 126/271 |
| 3,991,742 | 11/1976 | Gerber | 126/271 |
| 4,003,365 | 1/1977 | Wiegand et al. | 126/271 |
| 4,020,989 | 5/1977 | Kantz | 126/270 |

Primary Examiner—William F. O'Dea
Assistant Examiner—Henry C. Yuen
Attorney, Agent, or Firm—Van Valkenburgh and Lowe

[57] ABSTRACT

A modular unit collector for collecting radiant solar energy to heat a fluid such as water is adapted to be mounted at an inclination to better receive radiant solar rays and to permit gravity drainage of the fluid from the unit. The components include an upper surface and a lower surface forming a cavity. The upper surface includes an outer radiation transmission sheet and an inner radiation absorption sheet spaced from the transmission sheet and the lower surface includes a drainage pan formed to facilitate drainage to a lower end of the unit whenever it is inclined. The upper and lower surfaces are interconnected at the side edges and upper and lower end cap means at each end of the unit close the cavity. A spray means extends into the cavity to spray fluid against the undersurface of the radiation absorption sheet and there is a drainage outlet means adjacent to the lower end cap means.

17 Claims, 13 Drawing Figures

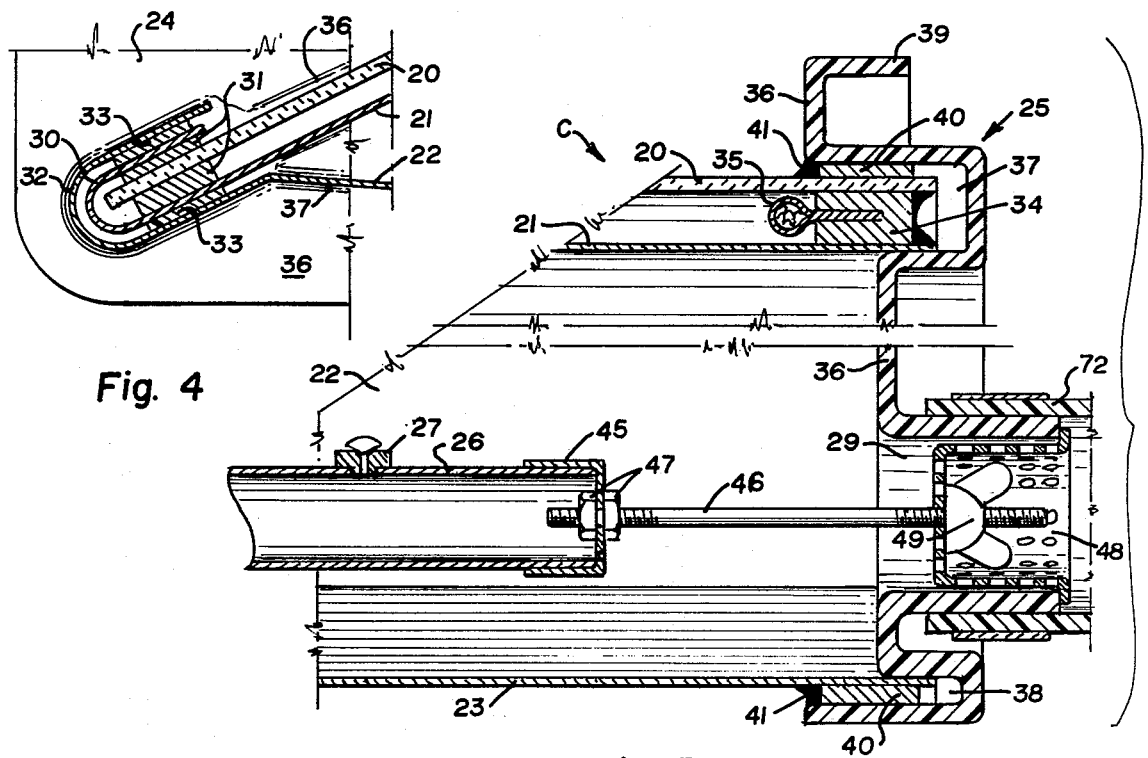
Fig. 4
Fig. 5
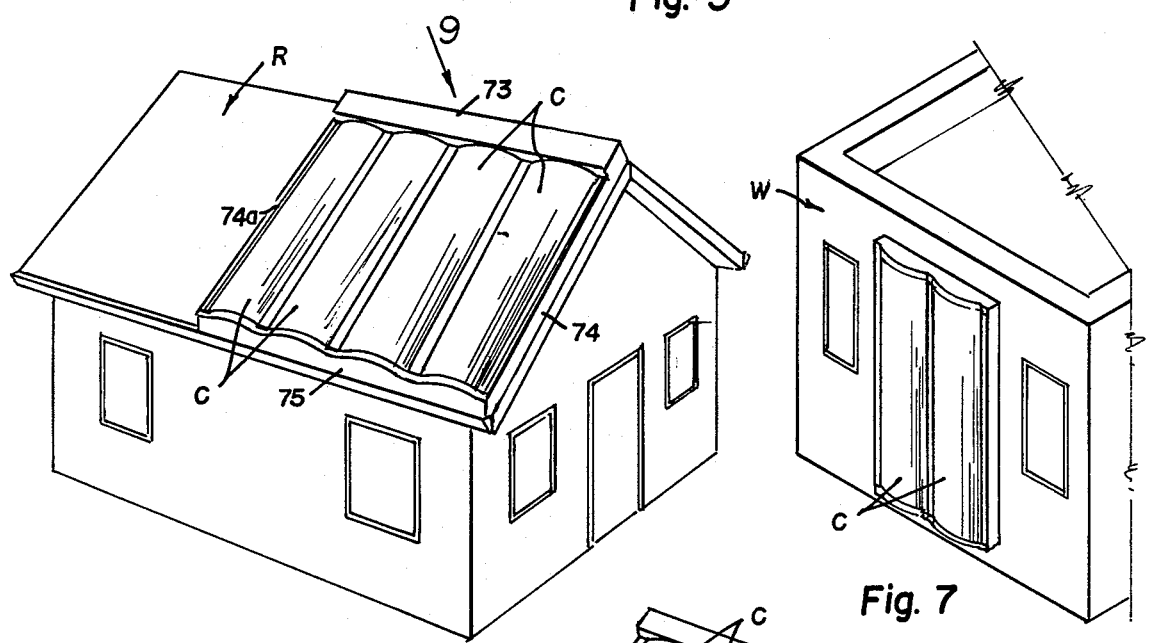
Fig. 6
Fig. 7
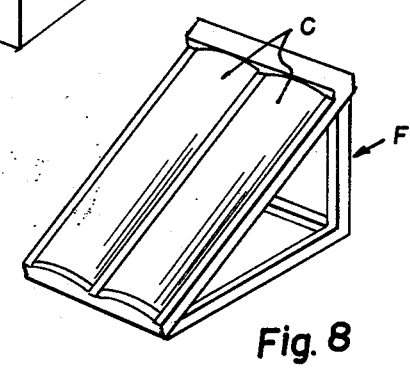
Fig. 8

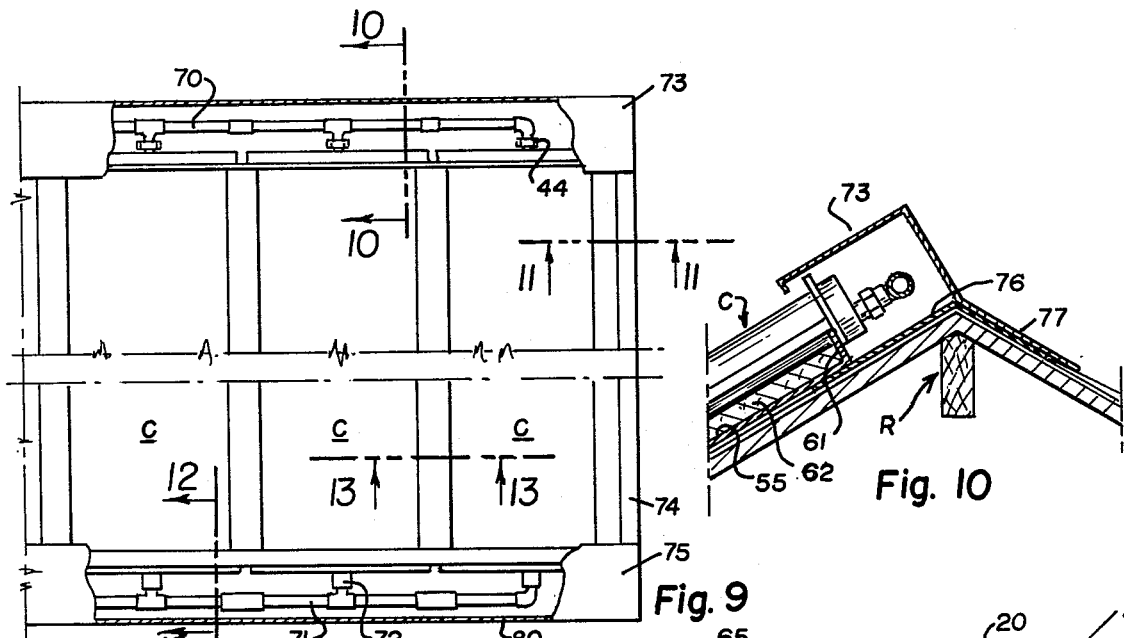
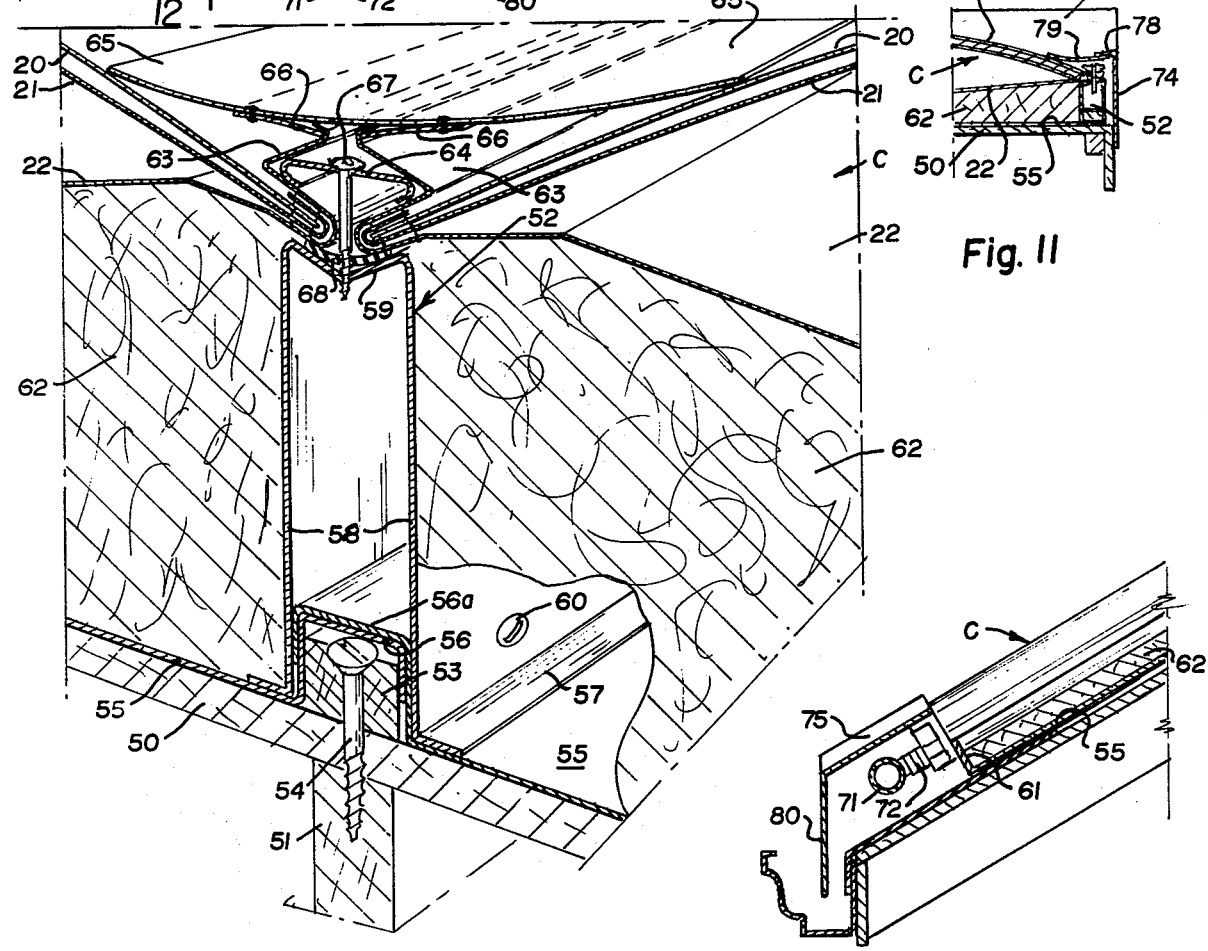
Fig. 9
Fig. 10
Fig. 11
Fig. 13
Fig. 12

MODULAR SOLAR RADIATION COLLECTOR

The present invention relates to apparatus for collecting solar radiation to convert the same into heat, and more particularly to apparatus for collecting solar radiation energy to convert the same to heat and to use water as the heat collection and transfer medium. This invention is an improvement over my application filed Sept. 23, 1974, Ser. No. 508,527, which has now matured into U.S. Pat. No. 4,003,365.

The essential feature of my prior invention resides in the combination including an enclosed structure with an inclined solar wall at one side of the structure. This solar wall includes a transparent heat transmission membrane overlying a heat absorption membrane which will receive the sun's rays and absorb the energy therefrom to convert the same into heat. A spray of water within the structure strikes the undersurface of the membrane to absorb the heat generated at the membrane. The heated water then falls from the membrane and into a trough at the base of the structure to flow therefrom for storage or use. This mode of direct heat transmission, from the membrane to the water was found to be highly efficient.

The present invention incorporates this principle of operation, direct heat transmission, in an improved structural modular unit suitable for many different types of applications.

Accordingly, the primary object of the invention is to provide a novel and improved solar energy collector which is formed as a group of modular units capable of being installed upon a roof, against a wall, upon a framework and upon other various types of structures.

Another object of the invention is to provide a novel and improved solar energy collector formed as a group of modular units which can be easily designed for any selected size and capacity and which can be easily enlarged or otherwise modified with additional modular units.

Another object of the invention is to provide a novel and improved solar energy collector as a group of modular units which uses a fluid heat transmission system with fluid flow through each unit being independent of the fluid flow through other units, for easy, simple installation and maintenance, and with each unit being joined to other units through only a manifolded supply line and a manifolded discharge line.

Another object of the invention is to provide a novel and improved modular unit for a solar energy collector which can be manufactured at a modest cost, which is easily and quickly installed on various types of structures, as upon a roof or against a wall, and which can be easily and economically maintained.

With the foregoing and other objects in view, my present invention comprises certain constructions, combinations and arrangements of parts and elements, as hereinafter described, defined in the appended claims, and illustrated in preferred embodiment by the accompanying drawing, in which:

FIG. 4 is a fragmentary sectional detail as taken from the indicated line 4—4 at FIG. 1, but on an enlarged scale.

FIG. 5 is a fragmentary sectional detail as taken from the indicated line 5—5 at FIG. 1, but on an enlarged scale and with a center portion broken away to conserve space.

FIG. 6 is a perspective view of a house structure showing an integrated group of modular units mounted on the roof as a solar energy collector.

FIG. 7 is a fragmentary perspective view of another structure showing a pair of modular units mounted upon a wall of the structure as a solar energy collector.

FIG. 8 is a perspective view of a pair of modular units mounted upon a framework as a solar energy collector.

FIG. 9 is a fragmentary plan view of a portion of the integrated group of collector units illustrated at FIG. 6, but on an enlarged scale with portions of cover plates broken away to show components otherwise hidden from view and other portions of the structure broken away to conserve space.

FIG. 10 is a fragmentary sectional detail as taken from the indicated line 10—10 at FIG. 9, but on an enlarged scale.

FIG. 11 is a fragmentary sectional detail as taken from the indicated line 11—11 at FIG. 9, but on an enlarged scale.

FIG. 12 is a fragmentary sectional detail as taken from the indicated line 12—12 at FIG. 9, but on an enlarged scale.

FIG. 13 is a fragmentary isometric perspective detail as taken from the indicated line 13—13 at FIG. 9, but on a further enlarged scale.

Figure 1:
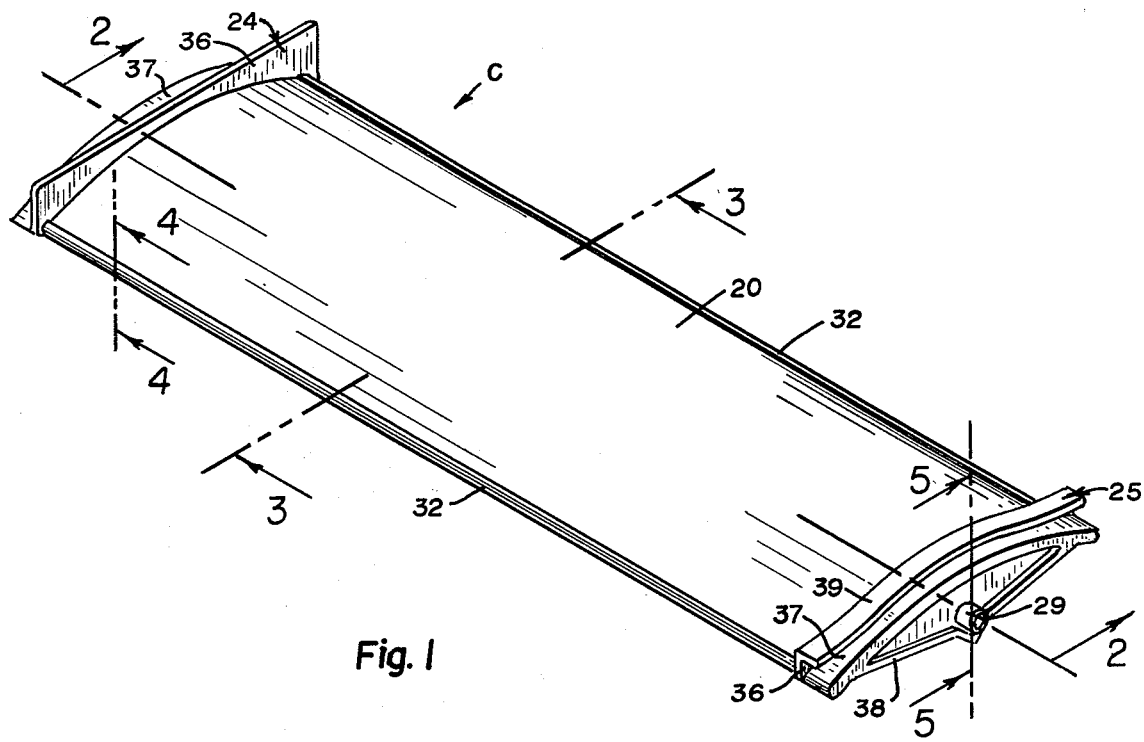
FIG. 1 is an isometric view of a modular solar energy collector unit constructed according to the principles of the invention.
Figure 2:
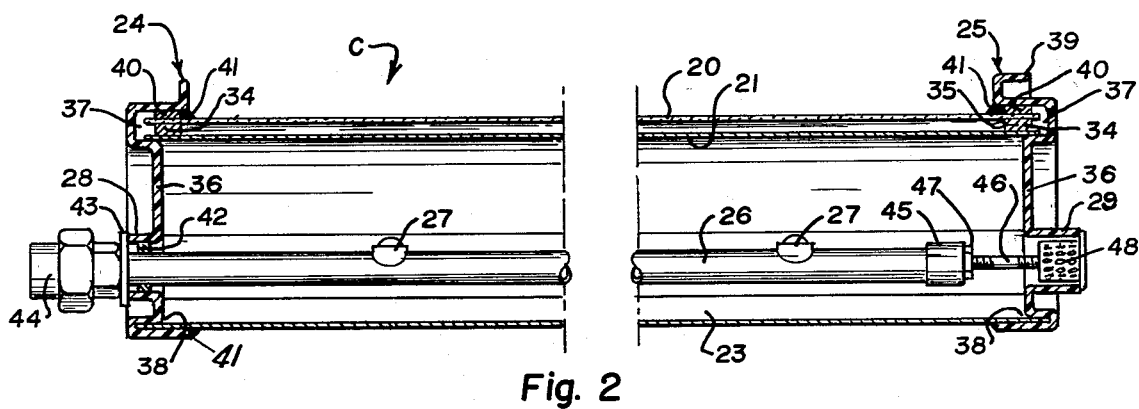
FIG. 2 is a longitudinal sectional view of the collector unit as taken from the indicated line 2—2 at FIG. 1, but on an enlarged scale and with the center portion broken away to conserve space.

Referring more particularly to the drawing, the improved solar energy collector is the combination of one or more modular collector units C. A selected number of collector units C are arranged side by side to produce a solar energy collector structure for any specific installation. Thus, a single modular collector unit C, hereinafter referred to as a collector C, will be first described, and then various ways of joining several units together to produce a solar energy collector will be described.

As best illustrated at FIG. 1, this collector C is a comparatively flat elongated unit rectangular in plan. A heat collection cavity is formed between elongated upper and under surfaces. The ends of this cavity are closed and the upper and under surfaces are joined at the longitudinal side edges of the unit so that it is somewhat lens-shaped in section. This collector C is mounted upon a roof, wall or framework at an inclined vertical position so that water, or any other suitable fluid, may flow through the collector. A supply line is provided at the upper end of the collector and a conduit from this supply line extends longitudinally through the unit. Spaced nozzles on this conduit produce a spray within the collector which strikes the underside of the upper face to absorb heat produced by radiation against this surface. The heated water will drain from the lower end of the collector, all as will be hereinafter further described. It is to be noted that the interior of the collector must be essentially water resistant, waterproof and vaporproof, to avoid losses by leakage.

Figure 3:
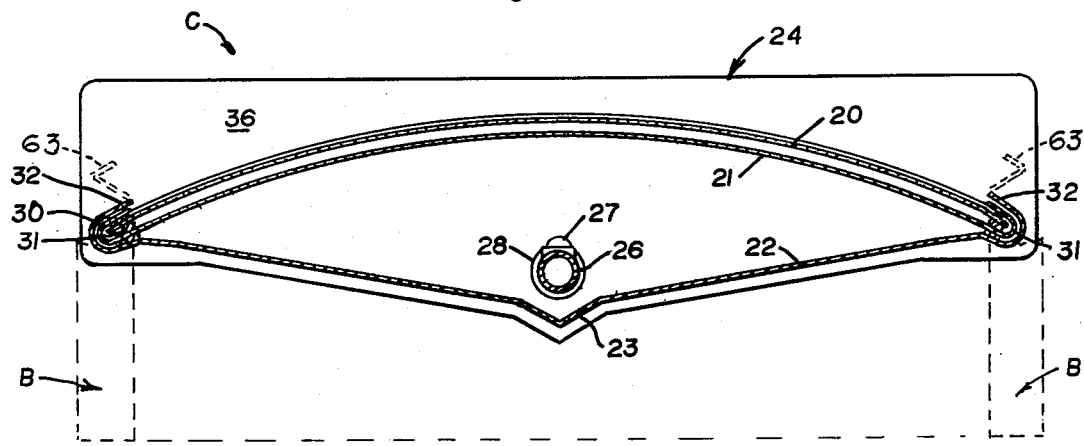
FIG. 3 is a transverse sectional view of the collector unit as taken from the indicated line 3—3 at FIG. 1, but on an enlarged scale and with broken lines indicating optional modifications of the unit and wall portions of a container whereon the unit may be mounted.

The upper surface of the unit collector C will be exposed to solar radiation and this surface includes a transparent outer radiation transmission sheet 20 and an inner opaque radiation absorption sheet 21 spaced a short distance below the upper transmission sheet 20. Both sheets forming this upper surface are formed as transversely, upwardly arched, cylindrical segments as illustrated and the longitudinal edges of the sheets 20 and 21 join with the edges of a pan 22 forming the undersurface of the unit. The pan is trough-like in section, with opposite side portions extending downwardly from their respective side edges and to a longitudinally extended gutter 23 at the center of the pan, as best shown at FIG. 3. Water dropping from the underside of the heat absorption sheet 21 and falling onto the pan will flow to the gutter and thence to the lower end of the unit. The cavity between the upper surface and the undersurface is closed by an upper end cap 24 and a lower end cap 25. A water conduit 26 having nozzles 27 extends through an opening 28 in the upper end cap 24. To complete the collector, a drainage opening 29 is provided in the lower end cap 25, all as hereinafter further described.

The transmission sheet 20 is of clear resin or glass material having sufficient thickness and structural strength to retain its form in the unit. A number of materials can be used, for example acrylic and acrylo-butadiene styrene A.B.S. resin sheets are suitable for this purpose. The absorption sheet 21 is preferably an opaque, water-resistant material. Metal, such as copper sheeting, is preferred. The upper surface of this absorption sheet 21 will be suitably blackened to most effectively absorb all possible solar radiation to convert the same into heat. These sheets are arched, as mentioned, spaced a short distance apart and joined at the longitudinal edges. To join at the edges, each edge of the absorption sheet 21 is folded about the adjacent edge of the transmission sheet 20, as by a fold 30, with a waterproof spacer tape 31 at each side of the transmission sheet and within the embrace of the fold 30. To attach the side edges of the pan 22 to the edge fold 30 of the absorption sheet, each longitudinal edge of the pan is folded about the adjacent fold 30 of the absorption sheet 21, as by a fold 32, with a waterproof sealer tape 33 lying against each side of the fold 30 and within the embrace of the fold 32, as best illustrated at FIG. 4. This arrangement effeactively seals the opposite longitudinal edges of the unit and, at the same time, the spacer tape 31 can be selected to maintain a suitable space between the transmission sheet 20 and the absorption sheet 21.

The edges of each end of the transmission sheet and absorption sheet are sealed and spaced apart by a transverse spacer tape 34 lying between these sheets. Accordingly, the space between the transmission and absorption sheets is sealed from moisture entry by the spacer tapes 31 and 34, and to complete the sealing arrangement, a dessicator strip 35 is provided adjacent to the lower, transverse spacer tape 33, between the transmission and absorption sheets. The dessicator strip 35 may be formed as a cloth piping whose edge is held between layers of the spacer tape 34. A dessicant, such as calcium chloride, fills this strip 35 and it will function to effectively eliminate any moisture that might otherwise permeate through any of the sealed edges of the unit.

The upper and lower end caps 24 and 25 are made of rigid, water-resistant material, and preferably, a formable material, such as a plastic resin, which may be cast, molded or pressure formed by any of a number of conventional operations. The basic structure of each end cap consists of a rectangular panel 36 having an upper-edge socket 37 and pan socket 38 in the face of the panels. These sockets conform to and receive the transverse ends of the upper and lower surfaces of the collector. Accordingly, the sockets join at their respective sides. The inner portion of each panel 36, within the embrace of the sockets, may be offset somewhat from the panel portion outside the sockets, as shown at FIG. 5. The upper end cap 24 is essentially rectangular in form, while the lower end cap 25 may be similar in form or it may be formed with an arched, flanged edge 39 adjacent to the upper edge socket.

Each upper socket 37 is proportioned to receive the edges of the spaced-apart transmission and absorption sheets 20 and 21 and to include a sealant tape 40 between the heat transmission sheet and the outward edge of the absorption sheet. The pan socket 38 is narrower and is proportioned to receive the transverse edge of the pan. These edges, when fitted into the sockets, are hermetically sealed with any suitable sealant 41, such as silicon rubbers, commonly available for this purpose.

The pipe opening 28 in the upper end cap 24 and the drainage opening 29 in the lower end cap 25 are located at the center of each respective cap adjacent to the gutter 23 at the bottom of the pan. Each opening is flanged to form a short tube to better mount an end of the conduit 26 in the opening 28 and to permit a tubular drain to be attached to the opening 29, as hereinafter further described.

The conduit 26 extends through the opening 28 in the upper end cap and the opening is somewhat larger in diameter than the pipe to provide clearance for the nozzles 27 which are on the conduit, for this conduit is to be inserted into the collector through the opening. A resilient washer 42, fitted about the conduit 26, fits in opening 28 to seal the opening and center the conduit herein. To hold the upper end of the conduit in place, a stop washer 43 on the conduit abuts against the opening 28 and against a union connector 44 on the end of the conduit.

The opposite end of the conduit 26 lies within the collector adjacent to the lower end cap 25. This end is closed by a pipe cap 45 having a centered threaded rod 46 extending through the drainage opening 29 in the lower end cap as best shown at FIG. 5. Lock nuts 47 on the rod 46 hold the rod in place upon the pipe cap 45, and a flanged strainer cup 48 with a centered hole to receive the rod 46 is fitted within the opeing 29. Accordingly, the rod extends through this cap. When the components are assembled, a wing nut 49 is turned upon the rod 46 to extend into the strainer 48 to secure the entire assembly in place.

In use, this collector unit C is mounted upon a roof or the like, at an inclination or vertically, to receive solar radiation. A water supply provides water under pressure to the conduit 26, resulting in a spray from the nozzles 27 and against the underside of the absorption sheet 21. The water is heated by solar radiation being absorbed by the sheet 21, and then falls from the sheet 21 and onto the pan 22. Thence, the water flows into the gutter and to the lower end cap. A drainage system then picks up the water as it flows through the strainer cup 48 and from the drainage opeing 29. It is to be noted that the water supply and drainage lines may be single lines, if only a single collector unit C is used, or they may be manifold lines, if a group of collector units are combined. The source of the supply water under pressure and the structure of the collector system for the heated water are not described herein since many different types of conventional arrangements may be used.

The manner of mounting a collector C, or a group of collectors, may vary. The collector will usually be mounted upon a box or box-like structure to hold it in place and also provide a suitable insulation space underneath the collector. Insulation is necessary to prevent heat loss from the pan 22 as heated water is collected upon it and flows to the drain. Thus, unless heat loss from the pan can be transmitted directly to the area to be heated, as where the collector units also form the ceiling of a room, insulation is essential. FIG. 3 shows, in broken lines, the outline of a box B whereon a collector may be mounted. FIGS. 6, 7 and 8 show several modular unit collectors integrated into a unit and installed on different structures, as upon the roof R of a house, upon the wall W of a building and upon a structural framework F.

FIGS. 9–13 show a preferred system of installing collectors C, as upon a roof R, which may also be used with other structures. Ordinarily, a flat sloping or vertical surface will be provided for the mounting of the collectors C, and such surface may be the sheeting 50 of a roof. The modular collectors C will be placed upon the roof side by side. The width of the collectors C will preferably be such as to correspond with the spacing of rafters 51, say, for example, 24 inches, and the length of these collectors from top to bottom must not exceed the length of the rafters. For structural continuity, it becomes desirable to support the joining edges of the collectors C directly over the rafters, although this is not essential because no great weights are involved. For such support, the modular collectors C are placed side by side across the roof, with the adjacent edges of adjacent collectors being upon a support wall 52 which is secured to the roof sheet 50. To prevent movement of the collector assembly, properly spaced, parallel sleepers 53 are affixed to the roof sheet 50, as by screws 54, and the support walls 52 and other components are secured to the sleepers, as shown at FIG. 13. Preferably, these sleepers are directly above the rafters, and their length will be the same as the length of the collectors C.

A flat floor plate 55, whose length is the same as the length of the collectors, will lie between adjacent sleepers 53, and one edge of each plate 55 is folded upwardly, over and about each sleeper 53 as at overfold 56. The opposite edge of the floor plate 55 will form a similar edge overfold 56a which overlies the overfold 56 of the adjacent plate 55 to thus snugly lock the plates together.

The support wall 52 also extends up the roof the length of a collector C. It is hat-shaped in section, having foot flanges 57, side plates 58 and a dished-down, trough-shaped top 59. It fits over the edge folds 56 and 56a, with the foot flanges 57 resting upon the floor plates 55. Suitable bolts 60 lock the support walls 52 and floor plates 55 to the sleepers. To complete this supporting arrangement, each end of the floor plate may be upturned, as at 61, FIGS. 10 and 12, to lie against the underside of the pans adjacent to the end caps 24 and 25 to complete a box-like retainer underneath the pan 22 which is filled with insulation 62.

The longitudinal edges of each collector will lie on one-half of the trough-shaped tops of the support walls 52 at the sides of the collector, and each wall 52 can support two collector edges, as best shown at FIG. 13. To provide an effective hold-down assembly to secure the collectors to the walls, as hereinafter described, the side edges of each pan 22 are continued beyond the folds 32, theretofore described, as an elongated, double fold 63 to provide, in combination with the fold 32, a W-shaped lock form. This is indicated in broken lines at FIG. 3 and is shown at FIG. 13. A metal spacer strip 64 is placed between opposite W-formed folds to better hold the adjacent collectors in place upon the walls. An elongated, transparent cover strip 65 will overlie the adjacent edges of two collectors, above the W-folds 63, and the width of this cover strip is sufficient to permit it to reach laterally a distance sufficient to permit its edges to engage the top surfaces of the transmission sheets 20 of the adjacent collectors. Opposing lock strips 66 are affixed to the underside of each cover strip 65 to engage the opposing upper legs of the W-folds 63 of each collector and thereby secure the cover strip against the w-fold 63. This assembly is secured in place by lock screws 67 extending through the cover strip 65, the spacer strip 64, between the edges of the adjacent collectors and into the top 59 of the wall 52. A resilient gasket 68 may be placed upon the wall top 59 between the wall top and collectors.

A significant advantage of the present invention, where a group of collector units are combined to lie side by side with the longitudinal edges upon the upright support strip, heretofore described, resides in the fact that the transparent cover strip 65 may be placed upon these units overlying the upper surfaces thereof to permit all of the radiant energy from sunlight striking the units to be effectively absorbed in the unit. This is in contrast with certain types of solar energy units which have comparatively wide mullions or strips between the sections where no radiant energy can be absorbed and, in fact, where significant heat losses can occur.

A group of collectors having their sides knit together, as above described, may be mounted upon a roof, as shown at FIGS. 6 and 9, and suitable edge coverings for the assembly of collectors will be provided, as shown at FIGS. 10, 11 and 12. Referring to FIG. 9, it is to be noted that a manifold pressure pipe 70 connects with the unions 44 of the conduits 26 extending into the several collector units. A low pressure drainage manifold 71 connects with the tubular drainage openings 29 of the lower end caps 25 of the collector units, and it is to be noted that these connections to the drainage manifold are by short rubber tubes 72, as shown at FIG. 5.

The edges of the group of collector units must be protected. As shown at FIG. 6, an upper cover 73 is provided at the top of the assembly of collector units. Side covers 74 and 74a are at the sides of the assembly and a bottom cover 75 is at the bottom of the assembly to direct drainage flow over the connectors and into the house gutte therebelow.

FIG. 10 illustrates a suitable cover 73 for the upper edges of the collectors to enclose the end cap 24 and the water supply manifold. This cover 73 overlies a flashing 76 extending above the cover and over the ridge of the roof, if the cover terminates near the ridge. The cover 73 includes an upper flashing shield 77 which may extend over the ridge of the roof, and the cover upstands therefrom to effectively box in the manifold 70 and the end caps 24.

The side cover 74 (FIG. 11) at the edge of the roof includes an upstanding wall which is attached to the facia board at the edge of the roof. A flange 78 outstands from the top of this side wall to overlie the cover. A transparent strip 79 is attached to this flange 78 to reach outwardly and over the cover to seal the edge of the collector against water, but still permit radiation to reach the edge of the collector. As shown at FIG. 11, this side cover is attached to the facia board of the roof. However, if a side edge of the collectors is not located at the edge of the roof, the bottom portion of the vertical wall of cover 74 can be turned to lie upon the roof surface in the manner of an ordinary flashing.

The bottom cover 75 of each collector (FIG. 12) is formed with its upper surface undulated to correspond with the arched flanges 39 at the upper surface of the lower end caps 25. This upper surface is affixed to the top flanges 39 with a suitable waterproof adhesive. Also, rivets or the like may be used to better secure this cover in place. The cover may overlie the gutter at the eave of the roof and a vertical skirt 80 depends from the lower edge of this undulated upper surface to direct water flow into the gutte and to better enclose the lower end caps 25 and drainage manifold 71. It is to be noted that this arrangement may be modified in various ways; for example, if the collector does not extend to the gutter, the skirt 80 may be shortened so that it extends only to the roof surface.

While I have now described my invention in considerable detail, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

What is claimed is:

1. In a modular collector unit for collecting radiant solar energy to heat fluid, such as water, adapted to be mounted at an inclination to better receive radiant solar rays and to permit gravity drainage of fluid from the bottom end of the unit when so inclined, comprising:
   (a) an upper, outer radiation transmission surface;
   (b) an intermediate radiation absorption surface which is spaced below the upper radiation transmission surface to define an upper cavity therebetween;
   (c) a lower surface including a drainage pan which is spaced below the radiation absorption surface to define a lower cavity therebetween;
   (d) a side connection means interconnecting the longitudinal inclined side edges of the upper, intermediate and lower surfaces;
   (e) top and bottom end cap means interconnecting the transverse top and bottom ends of the upper, intermediate and lower inclined surfaces whereby the side connection means and top and bottom end cap means enclose the upper and lower cavities between the respective surfaces;
   (f) a spray means longitudinally extended into the lower cavity to spray fluid against the underside of the radiation absorption surface; and
   (g) a drainage outlet means at the bottom of the lower cavity, and wherein:
      (1) the intermediate radiation absorption surface is transversely convexed and the drainage pan is transversely concaved, with the inclined side edges of the radiation absorption surface and the drainage pan coming together to form a longitudinal lens-shaped lower cavity with the space between the radiation absorption surface and the drainage pan being sufficient to permit the spray means in the lower cavity to spray fluid against substantially the entire undersurface of the radiation absorption surface; and
      (2) said spray means comprises an elongated, fluid-feed tube extending from the top end cap means and longitudinally through the lower cavity to a point near the bottom end cap means with nozzles spaced along the tube directed against the underside of said radiation absorption surface.

2. In a modular collector unit for collecting radiant solar energy to heat fluid, such as water, adapted to be mounted at an inclination to better receive radiant solar rays and to permit gravity drainage of fluid from the bottom end of the unit when so inclined, comprising:
   (a) an upper, outer radiation transmission surface;
   (b) an intermediate radiation absorption surface which is spaced below the upper radiation transmission surface to define an upper cavity therebetween;
   (c) a lower surface including a drainage pan which is spaced below the radiation absorption surface to define a lower cavity therebetween;
   (d) a side connection means interconnecting the longitudinal inclined side edges of the upper, intermediate and lower surfaces;
   (e) top and bottom end cap means interconnecting the transverse top and bottom ends of the upper, intermediate and lower inclined surfaces whereby the side connection means and top and bottom end cap means enclose the upper and lower cavities between the respective surfaces;
   (f) a spray means longitudinally extended into the lower cavity to spray fluid against the underside of the radiation absorption surface; and
   (g) a drainage outlet means at the bottom of the lower cavity, and wherein:
      (1) the intermediate radiation absorption surface is transversely convexed and the drainage pan is transversely concaved, with the inclined side edges of the radiation absorption surface and the drainage pan coming together to form a longitudinal lens-shaped lower cavity with the space between the radiation absorption surface and the drainage pan being sufficient to permit the spray means in the lower cavity to sparay fluid against substantially the entire undersurface of the radiation absorption surface; and
      (2) the aforesaid side connection means includes a fold at each side edge of the drainage pan, about and embracing the adjacent side edges of the radiation absorption surface.

3. The collector unit defined in claim 2, wherein the drainage pan includes:
   a trough extended to the drainage outlet means.

4. The collector unit defined in claim 2, wherein said spray means comprises:
   an elongated fluid-feed tube extended through the top end cap and longitudinally through the lower cavity to a point near the bottom end cap; and
   nozzles spaced along the tube directed against the underside of said radiation absorption surface.

5. The collector unit defined in claim 4, wherein:
   said modular unit has mirror-symmetry with respect to a vertical longitudinal plane through the unit; and
   said pan includes a trough at its center to direct flow to the central portion of the bottom of the unit.

6. The collector unit defined in claim 5, wherein said drainage outlet means comprises:
   an outlet through the bottom end cap adjacent to said trough.

7. In the collector unit defined in claim 6, wherein:
the upper end of said fluid-feed tube extends through and is held at the top end cap;
the lower end of said tube is adjacent to the drainage outlet;
the lower end of said tube is closed, and a rod extends axially therefrom into said outlet;
a strainer at the outlet is mounted upon the rod; and
means is provided on the rod to hold the strainer in place and at the same time, place the rod under tension to pull the top and bottom end caps together and against the ends of the aforesaid upper intermediate and lower surfaces.

8. In the collector unit defined in claim 7 wherein:
the end caps are formed with sockets to receive the edges of the upper, intermediate and lower surfaces.

9. A panel formed as a plurality of collector units as defined in claim 7, in a side by side array with the inclined longitudinal side edges of adjacent units being closely adjacent to each other; and including
a longitudinal support wall below each pair of adjacent side edges.

10. The panel defined in claim 9, wherein:
said support walls constitute beam-like structures mounted upon a flat sheet and hold the collector units above the sheet; and
insulation in the cavity between the underside of said unit lower surfaces and the sheet.

11. The panel defined in claim 9, wherein:
the top surface of a support wall is formed with a depressed groove to facilitate mounting the side edges of adjacent collector units thereon.

12. The panel defined in claim 9, wherein:
the fluid-feed tubes of each collector unit are extended above each unit and are interconnected to a common supply manifold; and
said outlets of each collector unit are interconnected to a common drain manifold.

13. The panel defined in claim 12, wherein:
the edges of the panel are covered by a sheeting.

14. The panel defined in claim 9, including:
a transparent cover strip mounted above two adjoining edges of adjacent units to overlie said edges;
the edges of said strip extending to and engaging the upper surface of each adjacent unit to form an enclosed space below the said cover strip.

15. The collector unit defined in claim 2, wherein the folded edges of the drainage pan about the edges of the upper surface include:
folded metal strips extending above the unit to facilitate connecting groups of modular units together.

16. The collector unit defined in claim 2, wherein:
(1) the upper rdiation transmission surface is transversely convexed to lie a short distance above the intermediate radiation absorption surface with the side edges of the two surfaces coming together; and
(2) the aforesaid side connection means includes a fold at each side edge of the radiation absorption surface which lies within the embrace of an aforesaid fold of the drainage pan, while the fold at each side edge of the radiation absorption surface is about and embracing the adjacent side edge of the radiation transmission surface.

17. In the collector unit defined in claim 16, including:
spacer tape means between the folded edges of the drainage pan and the folded edges of the radiation absorption surface and between the folded edges of the radiation absorption surface and the edges of the radiation transmission surface whereby to effectively seal these interconnected edges and space them apart a short distance.

* * * * *